(12) United States Patent
Tsai et al.

(10) Patent No.: US 11,581,790 B2
(45) Date of Patent: Feb. 14, 2023

(54) WIRING METHOD OF STATOR OF ROTATING ELECTRIC MACHINE

(71) Applicant: DELTA ELECTRONICS, INC., Taoyuan (TW)

(72) Inventors: Cheng-Hsun Tsai, Taoyuan (TW); Yung-Chih Hsu, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 35 days.

(21) Appl. No.: 17/169,517

(22) Filed: Feb. 7, 2021

(65) Prior Publication Data

US 2022/0069683 A1    Mar. 3, 2022

(30) Foreign Application Priority Data

Aug. 28, 2020    (CN) .......................... 202010885404.9

(51) Int. Cl.
*H01F 7/06*      (2006.01)
*H02K 15/095*    (2006.01)
*H02K 1/14*      (2006.01)

(52) U.S. Cl.
CPC ........... *H02K 15/095* (2013.01); *H02K 1/146* (2013.01)

(58) Field of Classification Search
CPC ............................... H02K 15/095; H02K 1/14
See application file for complete search history.

(56) References Cited

U.S. PATENT DOCUMENTS

| 6,565,032 B1 | 5/2003 | Kobayashi et al. |
| 10,778,374 B2 * | 9/2020 | Zhang .................. H04L 1/1657 |
| 2015/0008786 A1 | 1/2015 | Endo et al. |
| 2018/0226852 A1 | 8/2018 | Kitamura et al. |
| 2019/0207460 A1 | 7/2019 | Iwaki et al. |

FOREIGN PATENT DOCUMENTS

| CN | 100423416 C | 10/2008 | |
| CN | 103370856 B | 2/2017 | |
| CN | 107408859 B | 7/2019 | |
| JP | 2002-027694 A | 1/2002 | |
| JP | 2004-260985 A | 9/2004 | |
| JP | 2014-033550 A | 2/2014 | |
| TW | 201828573 A | 8/2018 | |
| WO | WO-2012111076 A1 * | 8/2012 | ........... H02K 15/095 |
| WO | 2016/120969 A1 | 8/2016 | |
| WO | 2019/073509 A1 | 4/2019 | |

* cited by examiner

*Primary Examiner* — Paul D Kim

(74) *Attorney, Agent, or Firm* — CKC & Partners Co., LLC

(57) ABSTRACT

A wiring method of a stator of a rotating electric machine includes: winding m-th layer of a first coil in a first direction from an outer-diameter side toward an inner-diameter side of the stator; winding (m+1)-th layer of the first coil in a second direction opposite to the first direction, a closest distance between n-th layer of the first coil and a centerline is less than a threshold; winding m-th layer of a second coil in the first direction; winding (m+1)-th layer of the second coil in the second direction, the turns of n-th layer of the second coil is equal to the turns of the n-th layer of the first coil minus two; sequentially winding from (n+1)-th layer of the second coil to a final layer of the second coil so as to fill the first wiring region and/or the second wiring region.

11 Claims, 10 Drawing Sheets

WIRING METHOD OF STATOR OF ROTATING ELECTRIC MACHINE

RELATED APPLICATIONS

This application claims priority to Chinese Application Serial Number 202010885404.9, filed Aug. 28, 2020, which is herein incorporated by reference.

BACKGROUND

Field of Invention

The present invention relates to a wiring method of a stator of a rotating electric machine. More particularly, the present invention relates to a wiring method for increasing a space factor.

Description of Related Art

Traditionally, each of tooth portions of a stator of a rotating electric machine (e.g., motors or generators) is usually wound with the same number of turns, and a coil between two adjacent ones of the tooth portions is radially extended from and symmetrical to a central axis of the stator by the same pitch. In other words, regarding the traditional rotating electric machine, the coil arrangement manner and the number of turns of each tooth portion are the same. However, because the tooth portions of the stator of the traditional rotating electric machine is wound by the same coil arrangement manner, when the remaining space is less than two turns of coil, the tooth portions of the stator could not be wound, such that the available winding space between two adjacent ones of the tooth portions could not be fully utilized, thereby limiting the torque performance of the rotating electric machine.

SUMMARY

The present invention provides a wiring method of a stator of a rotating electric machine. The stator has plural first tooth portions and plural second tooth portions. One of the first tooth portions is located between two adjacent ones of the second tooth portions. A slot is formed between the one of the first tooth portions and one of the second tooth portions adjacent to the one of the first tooth portions. The slot is divided by a centerline extending toward an axis of the stator to form a first wiring region adjacent to the one of the first tooth portions and a second wiring region adjacent to the one of the second tooth portions. The wiring method includes: winding m-th layer of a first coil within the first wiring region in a first direction, in which the first direction is from an outer-diameter side of the stator toward an inner-diameter side of the stator; winding (m+1)-th layer of the first coil in a second direction to overlay the m-th layer of the first coil, in which the second direction is from the inner-diameter side of the stator toward the outer-diameter side of the stator; winding (n+1)-th layer of the first coil according to a manner that the (n+1)-th layer of the first coil would not slide off the stator when a closest distance between n-th layer of the first coil and the centerline is less than a threshold; winding m-th layer of a second coil within the second wiring region in the first direction; winding (m+1)-th layer of the second coil in the second direction to overlay the m-th layer of the second coil; winding n-th layer of the second coil, in which a number of turns of the n-th layer of the second coil is equal to a number of turns of the n-th layer of the first coil minus two; sequentially winding from (n+1)-th layer of the second coil to a final layer of the second coil so as to fill the second wiring region and/or the first wiring region, in which one of turns of the final layer of the second coil which is close to the outer-diameter side of the stator is located at an end position closest to the centerline within the second wiring region; and sequentially winding from (n+2)-th layer of the first coil to a final layer of the first coil within the slot so as to fill the first wiring region and/or the second wiring region.

In accordance with one or more embodiments of the invention, m is an odd number, and m≤n.

In accordance with one or more embodiments of the invention, the threshold is equal to a wire diameter of the first coil times 0.6.

In accordance with one or more embodiments of the invention, if n is an odd number, a number of turns of the (n+1)-th layer of the first coil is equal to the number of turns of the n-th layer of the first coil minus one.

In accordance with one or more embodiments of the invention, if n is an even number, a number of turns of the (n+1)-th layer of the first coil is equal to the number of turns of the n-th layer of the first coil.

In accordance with one or more embodiments of the invention, a number of turns of one of odd-numbered layers of the second coil which are wound after the n-th layer of the second coil is equal to a number of turns of a layer of the second coil that is wound preceding the one of the odd-numbered layers minus one. The odd-numbered layers of the second coil do not include the final layer of the second coil.

In accordance with one or more embodiments of the invention, a number of turns of one of even-numbered layers of the second coil which are wound after the n-th layer of the second coil is equal to a number of turns of a layer of the second coil that is wound preceding the one of the even-numbered layers minus two. The even-numbered layers of the second coil do not include the final layer of the second coil.

In accordance with one or more embodiments of the invention, if the final layer of the second coil is wound in the first direction, a final turn of the final layer of the second coil is ended at a position that is closest to and not exceeding the centerline.

In accordance with one or more embodiments of the invention, if the final layer of the second coil is wound in the second direction, a number of turns of the final layer of the second coil is equal to a number of turns of a layer of the second coil that is wound preceding the final layer of the second coil minus two.

In accordance with one or more embodiments of the invention, winding from the (n+2)-th layer of the first coil to the final layer of the first coil so as to fill a space of the first wiring region and/or the second wiring region of the slot.

In accordance with one or more embodiments of the invention, the wiring method further includes: after winding the final layer of the first coil, increasing a number of turns of at least one of layers that are from the (n+1)-th layer of the second coil to the final layer of the second coil so as to fill a remaining space of the first wiring region and the second wiring region.

In order to let above mention of the present invention and other objects, features, advantages, and embodiments of the present invention to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. The using of "first", "second", "third", etc. in the specification should be understood for identify units or data described by the same terminology, but are not referred to particular order or sequence.

Figure 1:
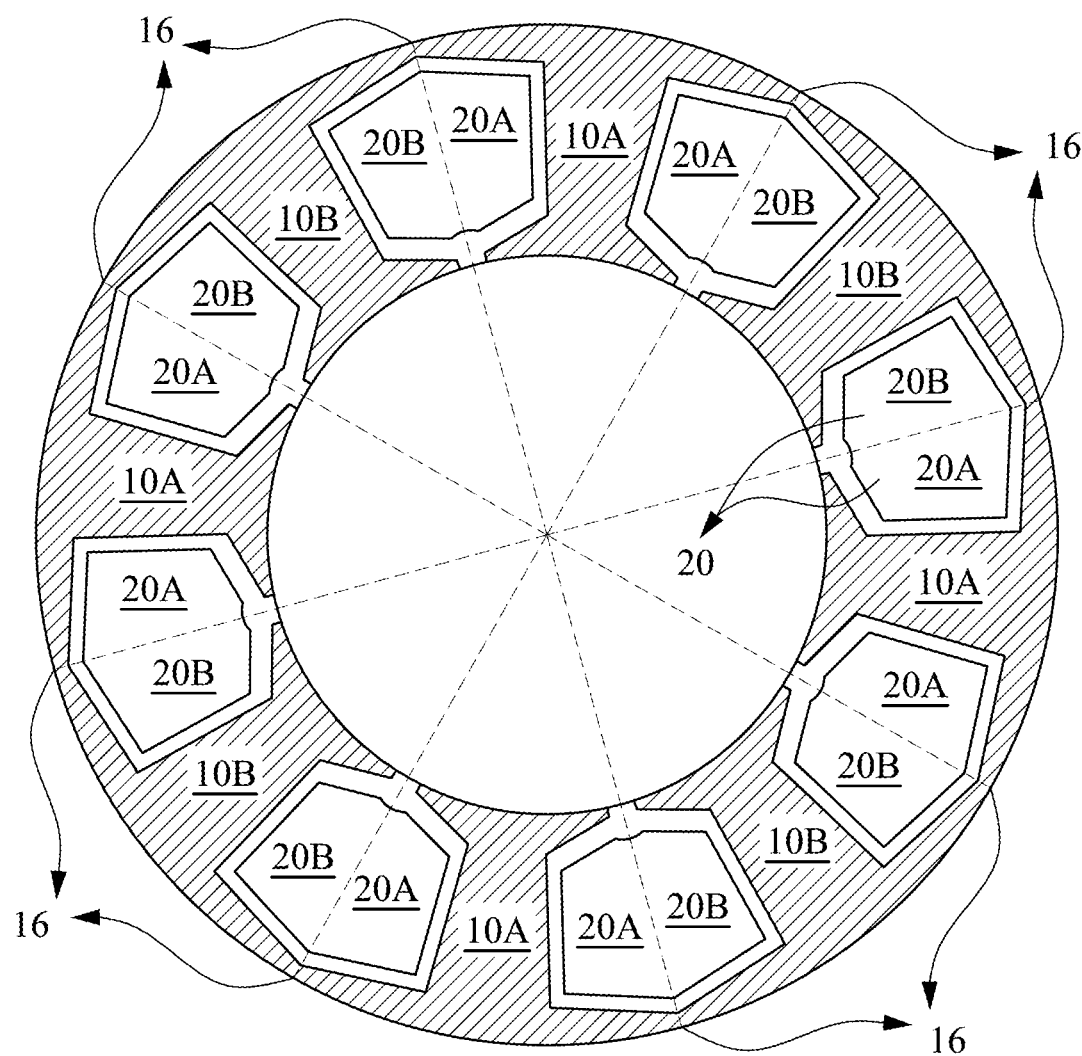
FIG. 1 illustrates a cross-sectional view of a stator of a rotating electric machine according to some embodiments of the present invention.

FIG. 1 illustrates a cross-sectional view of a stator 100 of a rotating electric machine according to some embodiments of the present invention. The stator 100 has plural first tooth portions 10A and plural second tooth portions 10B. Plural first tooth portions 10A and plural second tooth portions 10B are alternately arranged to each other. In other words, one of the first tooth portions 10A is located between two second tooth portions 10B which are adjacent to the one of the first tooth portions 10A, and one of the second tooth portions 10B is located between two first tooth portions 10A which are adjacent to the one of the second tooth portions 10B.

A slot 20 is formed between one of the first tooth portions 10A and one of the second tooth portions 10B which is adjacent to the one of the first tooth portions 10A. The slot 20 is divided by a centerline 16 extending toward an axis of the stator 100 so as to form a first wiring region 20A which is adjacent to the corresponding one of the first tooth portions 10A and a second wiring region 20B which is adjacent to the corresponding one of the second tooth portions 10B.

The first wiring region 20A and the second wiring region 20B are used for winding coils. Specifically, the first tooth portion 10A is wound by a first coil (not shown in FIG. 1), and the first coil is wound within the first wiring region 20A adjacent to the first tooth portion 10A, however, a portion of the first coil may exceed the first wiring region 20A. Specifically, the second tooth portion 10B is wound by a second coil (not shown in FIG. 1), and the second coil is wound within the second wiring region 20B adjacent to the second tooth portion 10B, however, a portion of the second coil may exceed the second wiring region 20B.

The present invention discloses a wiring method for fully utilizing the space of the slot 20 between two adjacent tooth portions 10A and 10B to be wound, thereby effectively improving the torque performance of the rotating electric machine. It is noted that FIG. 1 shows that the stator 100 includes eight tooth portions (i.e., four first tooth portions 10A and four second tooth portion 10B), however, the present invention is not limited thereto. The wiring method of the present invention is suitable for the rotating electric machine with a stator having an even number of the tooth portions.

The wiring method of the present invention includes the following steps.

Step (S1): m-th layer of a first coil is wound within the first wiring region 20A of the slot 20 in a first direction; (m+1)-th layer of the first coil is wound within the first wiring region 20A in a second direction to overlay the m-th layer of the first coil, in which m is started from 1 and m is an odd number. The first direction is from an outer-diameter side of the stator 100 toward an inner-diameter side of the stator 100. The second direction is opposite to the first direction, that is, the second direction is from the inner-diameter side of the stator 100 toward the outer-diameter side of the stator 100. Specifically, the first layer of the first coil is wound within the first wiring region 20A from the outer-diameter side toward the inner-diameter side of the stator 100, and then the second layer of the first coil is wound within the first wiring region 20A from the inner-diameter side toward the outer-diameter side of the stator 100 so as to overlay the first layer of the first coil, and then the third layer of the first coil is wound within the first wiring region 20A from the outer-diameter side toward the inner-diameter side of the stator 100 so as to overlay the second layer of the first coil, and so on. The step (S1) is performed until a closest distance between the current layer of the first coil and the centerline 16 is less than a threshold, and the current layer of the first coil is defined as n-th layer of the first coil, in which m n. In some embodiment of the present invention, the threshold is equal to a wire diameter of the first coil times 0.6, however, the present invention is not limited thereto. The threshold may be a preset distance value. In some embodiment of the present invention, in the step (S1), each layer of the first coil wound is wound by a manner for filling the first wiring region 20A with the largest space factor.

Step (S2): (n+1)-th layer of the first coil is wound within the slot 20 according to a manner that the (n+1)-th layer of the first coil would not slide off the stator 100, in which a portion of the first coil may exceed the first wiring region 20A. If the n-th layer of the first coil is wound from the outer-diameter side toward the inner-diameter side of the stator 100 in the step (S1), the (n+1)-th layer of the first coil is wound from the inner-diameter side toward the outer-diameter side of the stator 100 in the step (S2). If the n-th layer of the first coil is wound from the inner-diameter side toward the outer-diameter side of the stator 100 in the step (S1), the (n+1)-th layer of the first coil is wound from the outer-diameter side toward the inner-diameter side of the stator 100 in the step (S2). In some embodiment of the present invention, in step (S2), the manner that the (n+1)-th layer of the first coil would not slide off the stator 100 means that: if n is an odd number, a number of turns of the (n+1)-th layer of the first coil is equal to the number of turns of the n-th layer of the first coil minus one; if n is an even number, a number of turns of the (n+1)-th layer of the first coil is equal to the number of turns of the n-th layer of the first coil.

Step (S3): m-th layer of a second coil is wound within the second wiring region 20B of the slot 20 in the first direction; (m+1)-th layer of the second coil is wound within the second wiring region 20B in the second direction to overlay the m-th layer of the second coil, in which m is started from 1 and m is an odd number. The first direction is from an outer-diameter side of the stator 100 toward an inner-diameter side of the stator 100. The second direction is opposite to the first direction, that is, the second direction is from the inner-diameter side of the stator 100 toward the outer-diameter side of the stator 100. Specifically, the first layer of the second coil is wound within the second wiring region 20B from the outer-diameter side toward the inner-diameter side of the stator 100, and then the second layer of the second coil is wound within the second wiring region 20B from the inner-diameter side toward the outer-diameter side of the stator 100 so as to overlay the first layer of the second coil, and then the third layer of the second coil is wound within the second wiring region 20B from the outer-diameter side toward the inner-diameter side of the stator 100 so as to overlay the second layer of the second coil, and so on. The step (S3) is performed until (n−1)-th layer of the second coil is wound. In some embodiment of the present invention, in the step (S3), each layer of the second coil wound is wound by a manner for filling the second wiring region 20B with the largest space factor.

Step (S4): n-th layer of the second coil is wound within the slot 20. A number of turns of the n-th layer of the second coil is equal to the number of turns of the n-th layer of the first coil minus two. If the (n−1)-th layer of the second coil is wound from the outer-diameter side toward the inner-diameter side of the stator 100 in the step (S3), the n-th layer of the second coil is wound from the inner-diameter side toward the outer-diameter side of the stator 100 in the step (S4). If the (n−1)-th layer of the second coil is wound from the inner-diameter side toward the outer-diameter side of the stator 100 in the step (S3), the n-th layer of the second coil is wound from the outer-diameter side toward the inner-diameter side of the stator 100 in the step (S4).

Step (S5): layers of the second coil that are wound after the n-th layer of the second coil are sequentially wound within the slot 20 so as to fill the second wiring region 20B, in which a portion of the second coil may exceed the second wiring region 20B. The step (S5) is performed until one of turns of the current layer of the second coil which is close to the outer-diameter side of the stator is located at an end position closest to the centerline 16 within the second wiring region 20B, and the current layer of the second coil is defined as the final layer of the second coil. If the n-th layer of the second coil is wound from the outer-diameter side toward the inner-diameter side of the stator 100 in the step (S4), the (n+1)-th layer of the second coil is wound from the inner-diameter side toward the outer-diameter side of the stator 100 in the step (S5), and the (n+2)-th layer of the second coil is wound from the outer-diameter side toward the inner-diameter side of the stator 100 in the step (S5), and so on. If the n-th layer of the second coil is wound from the inner-diameter side toward the outer-diameter side of the stator 100 in the step (S4), the (n+1)-th layer of the second coil is wound from the outer-diameter side toward the inner-diameter side of the stator 100 in the step (S5), and the (n+2)-th layer of the second coil is wound from the inner-diameter side toward the outer-diameter side of the stator 100 in the step (S5), and so on. In some embodiments of the present invention, a number of turns of one of odd-numbered layers of the second coil which are wound after the n-th layer of the second coil is equal to a number of turns of a layer of the second coil that is wound preceding the one of the odd-numbered layers minus two, in which the odd-numbered layers of the second coil do not include the final layer of the second coil. In some embodiments of the present invention, a number of turns of one of even-numbered layers of the second coil which are wound after the n-th layer of the second coil is equal to a number of turns of a layer of the second coil that is wound preceding the one of the even-numbered layers minus two, in which the even-numbered layers of the second coil do not include the final layer of the second coil.

Step (S6): if the final layer of the second coil is wound from the outer-diameter side toward the inner-diameter side of the stator 100, a final turn of the final layer of the second coil is ended at a position that is closest to and not exceeding the centerline 16; if the final layer of the second coil is wound from the inner-diameter side toward the outer-diameter side of the stator 100, a number of turns of the final layer of the second coil is equal to a number of turns of a layer of the second coil that is wound preceding the final layer of the second coil minus two.

Step (S7): layers of the first coil that are wound after the (n+1)-th layer of the first coil are sequentially wound within the slot 20 so as to fill the slot 20 which includes the first wiring region 20A and/or the second wiring region 20B. If the (n+1)-th layer of the first coil is wound from the outer-diameter side toward the inner-diameter side of the stator 100 in the step (S2), the (n+2)-th layer of the first coil is wound from the inner-diameter side toward the outer-diameter side of the stator 100 in the step (S7), and the (n+3)-th layer of the first coil is wound from the outer-diameter side toward the inner-diameter side of the stator 100 in the step (S7), and so on. If the (n+1)-th layer of the first coil is wound from the inner-diameter side toward the outer-diameter side of the stator 100 in the step (S2), the (n+2)-th layer of the first coil is wound from the outer-diameter side toward the inner-diameter side of the stator 100 in the step (S7), and the (n+3)-th layer of the first coil is wound from the inner-diameter side toward the outer-diameter side of the stator 100 in the step (S7), and so on. The step (S7) is performed until the first coil has filled the remaining space of the first wiring region 20A and/or the second wiring region 20B of the slot 20, and the current layer of the first coil is defined as the final layer of the first coil.

In addition, the wiring method of the present invention may selectively perform step (S8) after performing the step (S7). In the step (S8), after winding the final layer of the first coil, if there is enough remaining space within the first wiring region 20A and the second wiring region 20B, a number of turns of at least one of layers that are from the (n+1)-th layer of the second coil to the final layer of the second coil is increased so as to fill a remaining space of the first wiring region 20A and the second wiring region 20B.

Hereinafter, the wiring method of the present invention will be explained by using FIGS. 2a-2d. FIGS. 2a-2d illustrate schematic views of a winding procedure of a portion of the stator 100 according to a first embodiment of the present invention.

Figure 2A:
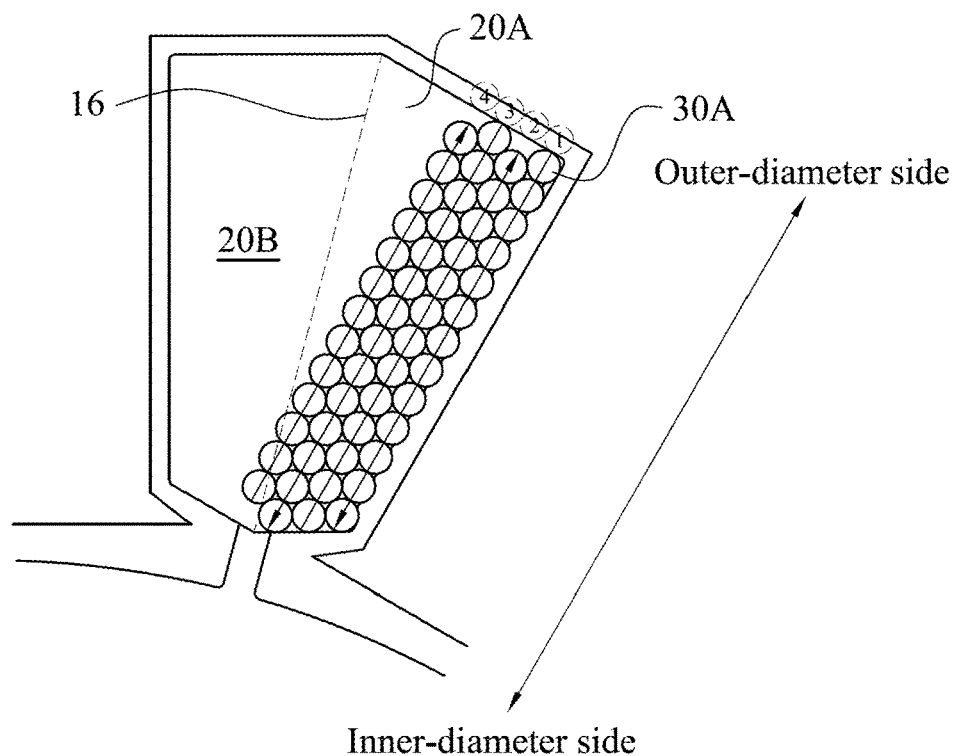
FIGS. 2a-2d illustrate schematic views of a winding procedure of a portion of the stator according to a first embodiment of the present invention.

In the first embodiment of the present invention, in step (S1), as shown in FIG. 2a, a first layer of a first coil 30A is wound within the first wiring region 20A of the slot 20 from the outer-diameter side of the stator 100 toward the inner-diameter side of the stator 100, and then a second layer of the first coil 30A is wound within the first wiring region 20A from the inner-diameter side of the stator 100 toward the outer-diameter side of the stator 100 so as to overlay the first layer of the first coil 30A, and so on. The step (S1) is performed until a closest distance between a third layer of the first coil 30A and the centerline 16 is less than a threshold (i.e., a wire diameter of the first coil 30A times 0.6), and the third layer of the first coil 30A is defined as n-th layer of the first coil 30A, that is, n=3. As shown in FIG. 2a, the first layer, the second layer, and the third layer of the first coil 30A are respectively wound according to the direction and the order of arrows ①, ②, and ③. As shown in FIG. 2a, the first layer, the second layer, and the third layer of the first coil 30A are wound by a manner for filling the first wiring region 20A with the largest space factor. Accordingly, the number of turns of the first layer of the first coil 30A is 13, and the number of turns of the second layer of the first coil 30A is 13, and the number of turns of the third layer of the first coil 30A is 14.

In the first embodiment of the present invention, in step (S2), as shown in FIG. 2a, a fourth layer (i.e., (n+1)-th layer) of the first coil 30A is wound within the slot 20 according to a manner that the fourth layer of the first coil 30A would not slide off the stator 100. As shown in FIG. 2a, the fourth layer of the first coil 30A is wound according to the direction and the order of arrow ④, and a portion of the first coil 30A would exceed the first wiring region 20A. Because n=3 is an odd number, a number of turns of the fourth layer (i.e., (n+1)-th layer) of the first coil 30A is equal to the number of turns (i.e., 14) of the third layer (i.e., n-th layer) of the first coil 30A minus one. Accordingly, a number of turns of the fourth layer of the first coil 30A is 13.

Figure 2B:
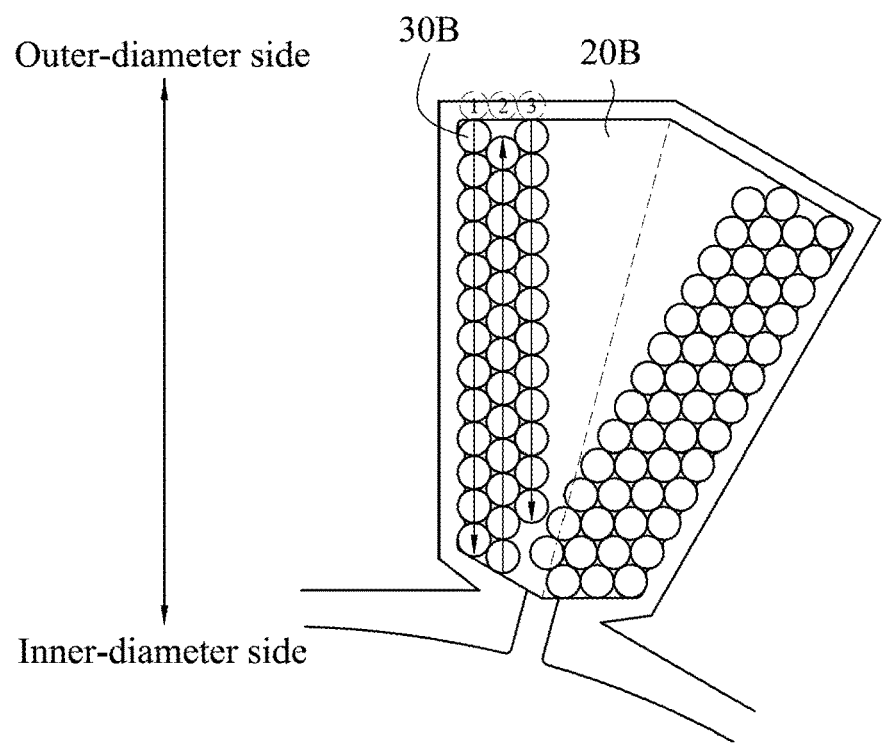

In the first embodiment of the present invention, in step (S3), as shown in FIG. 2b, a first layer of a second coil 30B is wound within the second wiring region 20B of the slot 20 from the outer-diameter side of the stator 100 toward the inner-diameter side of the stator 100, and then a second layer of the second coil 30B is wound within the second wiring region 20B from the inner-diameter side of the stator 100 toward the outer-diameter side of the stator 100 so as to overlay the first layer of the second coil 30B, and so on. The step (S3) is performed until the second layer (i.e., (n−1)-th layer) of the second coil 30B is wound. As shown in FIG. 2b, the first layer and the second layer of the second coil 30B are respectively wound according to the direction and the order of arrows ① and ②. As shown in FIG. 2b, the first layer and the second layer of the second coil 30B are wound by a manner for filling the second wiring region 20B with the largest space factor. Accordingly, the number of turns of the first layer of the second coil 30B is 13, and the number of turns of the second layer of the second coil 30B is 13.

In the first embodiment of the present invention, in step (S4), as shown in FIG. 2b, a third layer (i.e., n-th layer) of the second coil 30B is wound within the slot 20. As shown in FIG. 2b, the third layer of the second coil 30B is wound according to the direction and the order of arrow ③. A number of turns of the third layer (i.e., n-th layer) of the second coil 30B is equal to the number of turns (i.e., 13) of the third layer (i.e., n-th layer) of the first coil 30A minus two, and therefore, a number of turns of the third layer of the second coil 30B is 12.

Figure 2C:
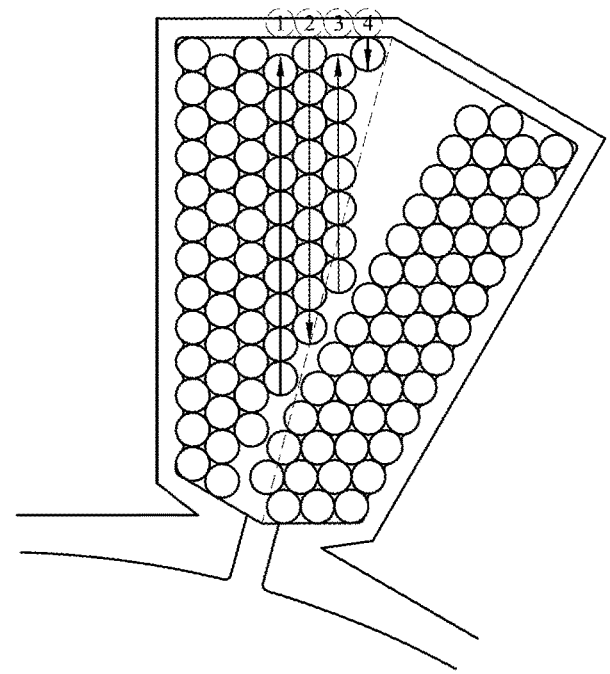

In the first embodiment of the present invention, in step (S5), as shown in FIG. 2c, layers of the second coil 30B that are wound after the third layer (i.e., n-th layer) of the second coil 30B are sequentially wound within the slot 20 so as to fill the second wiring region 20B, in which a portion of the second coil 30B would exceed the second wiring region 20B. The step (S5) is performed until one of turns of a seventh layer of the second coil 30B which is close to the outer-diameter side of the stator 100 is located at an end position closest to the centerline 16 within the second wiring region 20B, and the seventh layer of the second coil 30B is defined as the final layer of the second coil 30B. As shown in FIG. 2c, the fourth layer, the fifth layer, the sixth layer, and the seventh layer of the second coil 30B are respectively wound according to the direction and the order of arrows ①, ②, ③, and ④. As shown in FIG. 2c, a number of turns of one of even-numbered layers (i.e., the fourth layer and the sixth layer of the second coil 30B) of the second coil 30B which are wound after the third layer (i.e., n-th layer) of the second coil 30B is equal to a number of turns of a layer of the second coil 30B that is wound preceding the one of the even-numbered layers minus two, in which the even-numbered layers of the second coil 30B do not include the final layer of the second coil 30B. As shown in FIG. 2c, a number of turns of one of odd-numbered layers (i.e., the fifth layer of the second coil 30B) of the second coil 30B which are wound after the third layer (i.e., n-th layer) of the second coil 30B is equal to a number of turns of a layer of the second coil 30B that is wound preceding the one of the odd-numbered layers minus one, in which the odd-numbered layers of the second coil 30B do not include the final layer of the second coil 30B. Accordingly, a number of turns of the fourth layer of the second coil 30B is a number of turns (i.e., 12) of the third layer of the second coil 30B minus two, that is, a number of turns of the fourth layer of the second coil 30B is 10. Accordingly, a number of turns of the fifth layer of the second coil 30B is a number of turns (i.e., 10) of the fourth layer of the second coil 30B minus one, that is, a number of turns of the fifth layer of the second coil 30B is 9. Accordingly, a number of turns of the sixth layer of the second coil 30B is a number of turns (i.e., 9) of the fifth layer of the second coil 30B minus two, that is, a number of turns of the sixth layer of the second coil 30B is 7.

In the first embodiment of the present invention, in step (S6), as shown in FIG. 2c, because the seventh layer (i.e., the final layer) of the second coil 30B is wound from the outer-diameter side toward the inner-diameter side of the stator 100, a final turn of the seventh layer (i.e., the final layer) of the second coil 30B is ended at a position that is closest to and not exceeding the centerline 16. Accordingly, a number of turns of the seventh layer (i.e., the final layer) of the second coil 30B is 1.

Figure 2D:
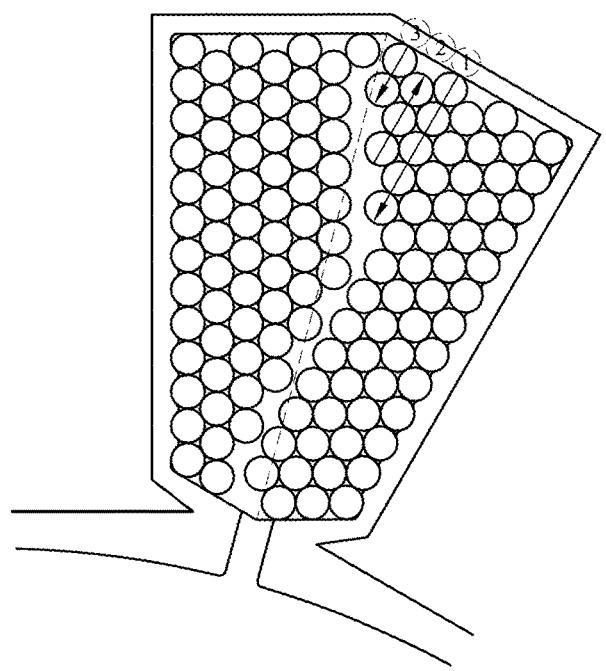

In the first embodiment of the present invention, in step (S7), as shown in FIG. 2d, layers of the first coil 30A that are wound after the fourth layer (i.e., the (n+1)-th layer) of the first coil 30A are sequentially wound within the slot 20 according to a manner that the layers of the first coil 30A would not slide off the stator 100 so as to fill the slot 20. The step (S7) is performed until the seventh layer of first coils 30A has filled the remaining space of the slot 20, and the seventh layer of the first coil 30A is defined as the final layer of the first coil 30A. As shown in FIG. 2d, the fifth layer, the sixth layer, and the seventh layer of the first coil 30A are respectively wound according to the direction and the order of arrows ①, ②, and ③. Accordingly, as shown in FIG. 2d, a number of turns of the fifth layer of the first coil 30A is 5, and a number of turns of the sixth layer of the first coil 30A is 3, and a number of turns of the seventh layer of the first coil 30A is 2.

Hereinafter, the wiring method of the present invention will be explained by using FIGS. 3a-3d. FIGS. 3a-3d illustrate schematic views of a winding procedure of a portion of the stator 100 according to a second embodiment of the present invention.

Figure 3A:
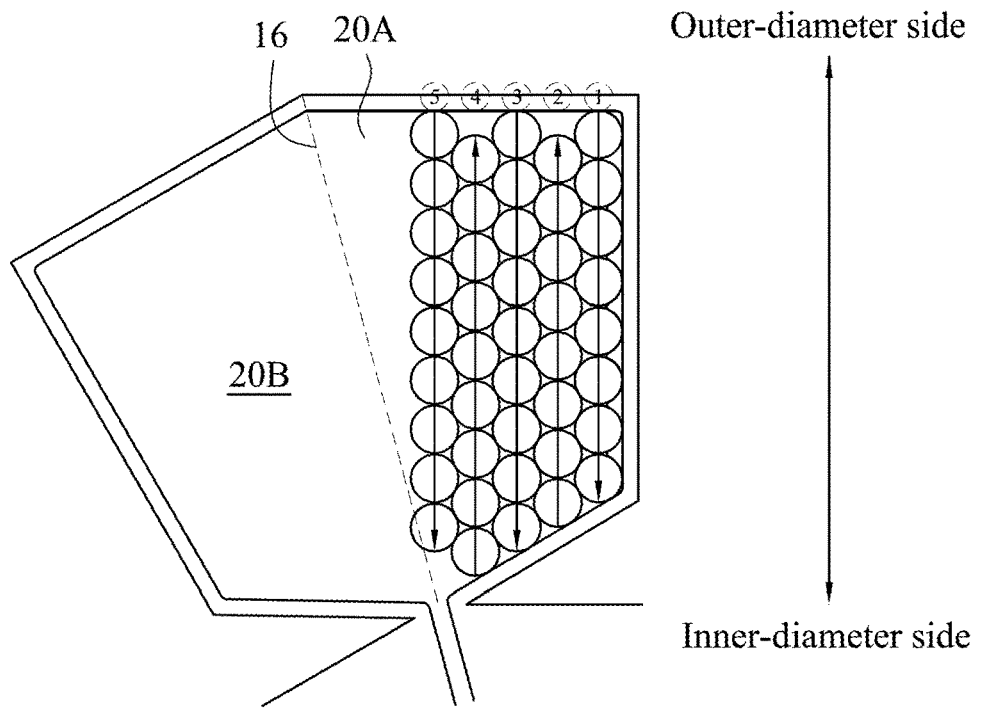
FIGS. 3a-3d illustrate schematic views for describing a winding procedure according to a second embodiment of the present invention.

In the second embodiment of the present invention, in step (S1), as shown in FIG. 3a, a first layer of a first coil 30A is wound within the first wiring region 20A of the slot 20 from the outer-diameter side of the stator 100 toward the inner-diameter side of the stator 100, and then a second layer of the first coil 30A is wound within the first wiring region 20A from the inner-diameter side of the stator 100 toward the outer-diameter side of the stator 100 so as to overlay the first layer of the first coil 30A, and so on. The step (S1) is performed until a closest distance between a fourth layer of the first coil 30A and the centerline 16 is less than a threshold (i.e., a wire diameter of the first coil 30A times 0.6), and the fourth layer of the first coil 30A is defined as n-th layer of the first coil 30A, that is, n=4. As shown in FIG. 3a, the first layer, the second layer, the third layer, and the fourth layer of the first coil 30A are respectively wound according to the direction and the order of arrows ①, ②, ③, and ④. As shown in FIG. 3a, the first layer, the second layer, the third layer, and the fourth layer of the first coil 30A are wound by a manner for filling the first wiring region 20A with the largest space factor. Accordingly, the number of turns of the first layer of the first coil 30A is 8, and the number of turns of the second layer of the first coil 30A is 8, and the number of turns of the third layer of the first coil 30A is 9, and the number of turns of the fourth layer of the first coil 30A is 9.

In the second embodiment of the present invention, in step (S2), as shown in FIG. 3a, a fifth layer (i.e., (n+1)-th layer) of the first coil 30A is wound within the slot 20 according to a manner that the fifth layer of the first coil 30A would not slide off the stator 100. As shown in FIG. 3a, the fifth layer of the first coil 30A is wound according to the direction and the order of arrow ⑤, and a portion of the first coil 30A would exceed the first wiring region 20A. Because n=4 is an even number, a number of turns of the fifth layer (i.e., (n+1)-th layer) of the first coil 30A is equal to the number of turns (i.e., 9) of the fourth layer (i.e., n-th layer) of the first coil 30A. Accordingly, a number of turns of the fifth layer of the first coil 30A is 9.

Figure 3B:
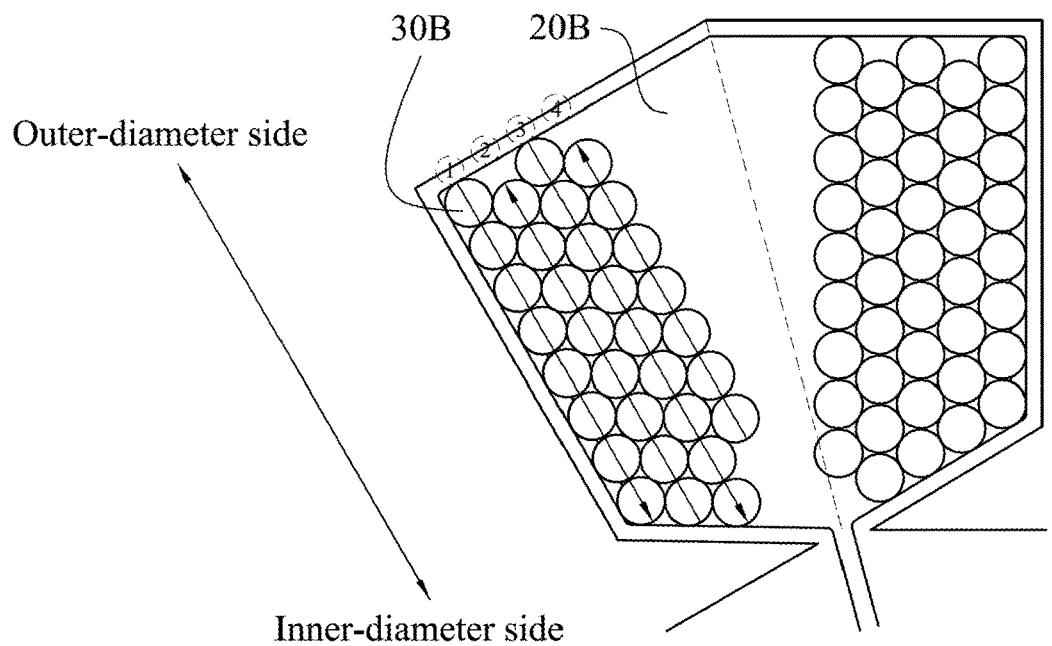

In the second embodiment of the present invention, in step (S3), as shown in FIG. 3b, a first layer of a second coil 30B is wound within the second wiring region 20B of the slot 20 from the outer-diameter side of the stator 100 toward the inner-diameter side of the stator 100, and then a second layer of the second coil 30B is wound within the second wiring region 20B from the inner-diameter side of the stator 100 toward the outer-diameter side of the stator 100 so as to overlay the first layer of the second coil 30B, and so on. The step (S3) is performed until the third layer (i.e., (n−1)-th layer) of the second coil 30B is wound. As shown in FIG. 3b, the first layer, the second layer, and the third layer of the second coil 30B are respectively wound according to the direction and the order of arrows ①, ②, and ③. As shown in FIG. 3b, the first layer, the second layer, and the third layer of the second coil 30B are wound by a manner for filling the second wiring region 20B with the largest space factor. Accordingly, the number of turns of the first layer of the second coil 30B is 8, and the number of turns of the second layer of the second coil 30B is 9, and the number of turns of the third layer of the second coil 30B is 9.

In the second embodiment of the present invention, in step (S4), as shown in FIG. 3b, a fourth layer (i.e., n-th layer) of the second coil 30B is wound within the slot 20. As shown in FIG. 3b, the fourth layer of the second coil 30B is wound according to the direction and the order of arrow ④. A number of turns of the fourth layer (i.e., n-th layer) of the second coil 30B is equal to the number of turns (i.e., 9) of the fourth layer (i.e., n-th layer) of the first coil 30A minus two, and therefore, a number of turns of the fourth layer of the second coil 30B is 7.

Figure 3C:
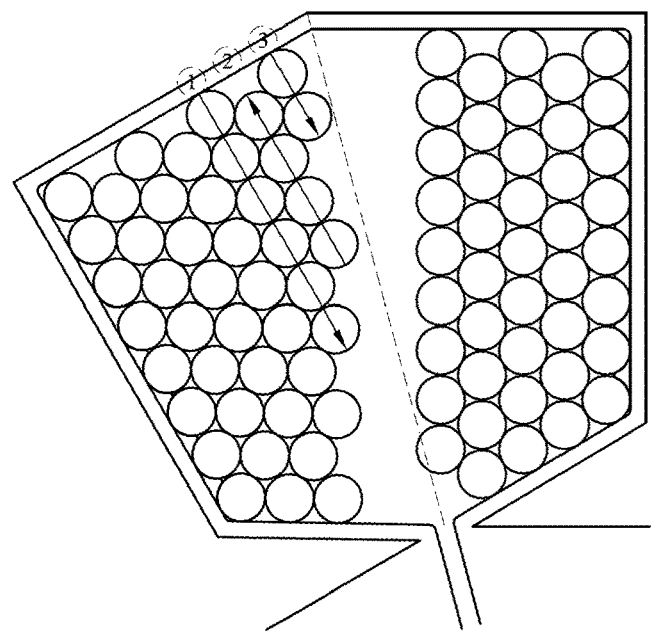

In the second embodiment of the present invention, in step (S5), as shown in FIG. 3c, layers of the second coil 30B that are wound after the fourth layer (i.e., n-th layer) of the second coil 30B are sequentially wound within the slot 20 so as to fill the second wiring region 20B. The step (S5) is performed until one of turns of a seventh layer of the second coil 30B which is close to the outer-diameter side of the stator 100 is located at an end position closest to the centerline 16 within the second wiring region 20B, and the seventh layer of the second coil 30B is defined as the final layer of the second coil 30B. As shown in FIG. 3c, the fifth layer, the sixth layer, and the seventh layer of the second coil 30B are respectively wound according to the direction and the order of arrows ①, ②, and ③. As shown in FIG. 3c, a number of turns of one of odd-numbered layers (i.e., the fifth layer of the second coil 30B) of the second coil 30B which are wound after the fourth layer (i.e., n-th layer) of the second coil 30B is equal to a number of turns of a layer of the second coil 30B that is wound preceding the one of the odd-numbered layers minus one, in which the odd-numbered layers of the second coil 30B do not include the final layer of the second coil 30B. As shown in FIG. 3c, a number of turns of one of even-numbered layers (i.e., the sixth layer of the second coil 30B) of the second coil 30B which are wound after the fourth layer (i.e., n-th layer) of the second coil 30B is equal to a number of turns of a layer of the second coil 30B that is wound preceding the one of the even-numbered layers minus two, in which the even-numbered layers of the second coil 30B do not include the final layer of the second coil 30B. Accordingly, a number of turns of the fourth layer of the second coil 30B is a number of turns (i.e., 12) of the third layer of the second coil 30B minus two, that is, a number of turns of the fourth layer of the second coil 30B is 10. Accordingly, a number of turns of the fifth layer of the second coil 30B is a number of turns (i.e., 7) of the fourth layer of the second coil 30B minus one, that is, a number of turns of the fifth layer of the second coil 30B is 6. Accordingly, a number of turns of the sixth layer of the second coil 30B is a number of turns (i.e., 6) of the fifth layer of the second coil 30B minus two, that is, a number of turns of the sixth layer of the second coil 30B is 4.

In the second embodiment of the present invention, in step (S6), as shown in FIG. 3c, because the seventh layer (i.e., the final layer) of the second coil 30B is wound from the outer-diameter side toward the inner-diameter side of the stator 100, a final turn of the seventh layer (i.e., the final layer) of the second coil 30B is ended at a position that is closest to and not exceeding the centerline 16. Accordingly, a number of turns of the seventh layer (i.e., the final layer) of the second coil 30B is 2.

Figure 3D:
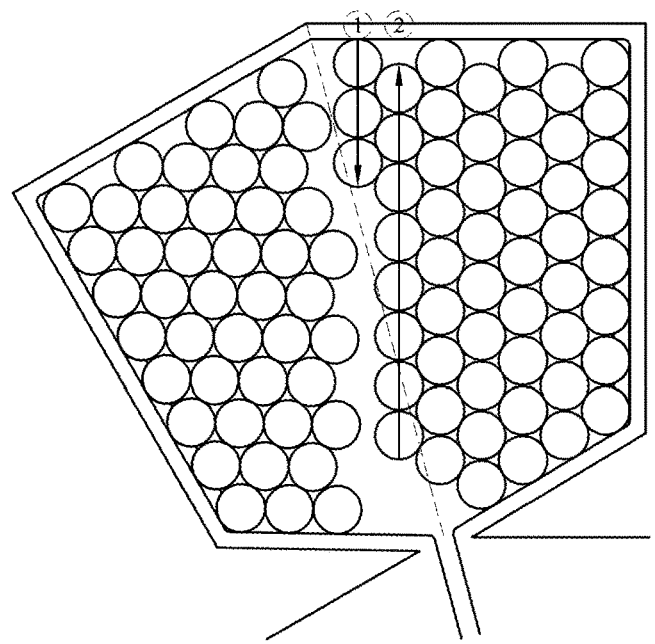

In the second embodiment of the present invention, in step (S7), as shown in FIG. 3d, layers of the first coil 30A that are wound after the fifth layer (i.e., the (n+1)-th layer) of the first coil 30A are sequentially wound within the slot 20 according to a manner that the layers of the first coil 30A would not slide off the stator 100 so as to fill the slot 20. The step (S7) is performed until the seventh layer of first coils 30A has filled the remaining space of the slot 20, and the seventh layer of the first coil 30A is defined as the final layer of the first coil 30A. As shown in FIG. 3d, the sixth layer and the seventh layer of the first coil 30A are respectively wound according to the direction and the order of arrows ① and ②. Accordingly, as shown in FIG. 3d, a number of turns of the sixth layer of the first coil 30A is 8, and a number of turns of the seventh layer of the first coil 30A is 3.

Hereinafter, the wiring method of the present invention will be explained by using FIGS. 4a-4e. FIGS. 4a-4e illustrate schematic views of a winding procedure of a portion of the stator 100 according to a third embodiment of the present invention.

Figure 4A:
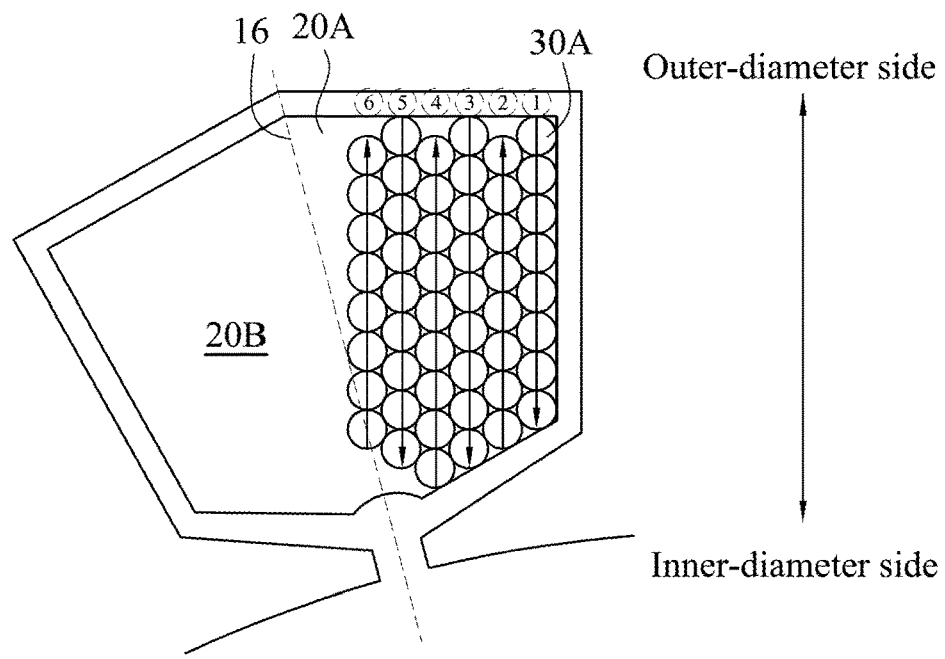
FIGS. 4a-4e illustrate schematic views for describing a winding procedure according to a third embodiment of the present invention.

In the third embodiment of the present invention, in step (S1), as shown in FIG. 4a, a first layer of a first coil 30A is wound within the first wiring region 20A of the slot 20 from the outer-diameter side of the stator 100 toward the inner-diameter side of the stator 100, and then a second layer of the first coil 30A is wound within the first wiring region 20A from the inner-diameter side of the stator 100 toward the outer-diameter side of the stator 100 so as to overlay the first layer of the first coil 30A, and so on. The step (S1) is performed until a closest distance between a fifth layer of the first coil 30A and the centerline 16 is less than a threshold (i.e., a wire diameter of the first coil 30A times 0.6), and the fifth layer of the first coil 30A is defined as n-th layer of the first coil 30A, that is, n=5. As shown in FIG. 4a, the first layer, the second layer, the third layer, the fourth layer, and the fifth layer of the first coil 30A are respectively wound according to the direction and the order of arrows ①, ②, ③, ④, and ⑤. As shown in FIG. 4a, the first layer, the second layer, the third layer, the fourth layer, and the fifth layer of the first coil 30A are wound by a manner for filling the first wiring region 20A with the largest space factor. Accordingly, the number of turns of the first layer of the first coil 30A is 8, and the number of turns of the second layer of the first coil 30A is 8, and the number of turns of the third layer of the first coil 30A is 9, and the number of turns of the fourth layer of the first coil 30A is 9, and the number of turns of the fifth layer of the first coil 30A is 9.

In the third embodiment of the present invention, in step (S2), as shown in FIG. 4a, a sixth layer (i.e., (n+1)-th layer) of the first coil 30A is wound within the slot 20 according to a manner that the sixth layer of the first coil 30A would not slide off the stator 100, and a portion of the first coil 30A would exceed the first wiring region 20A. As shown in FIG. 4a, the sixth layer of the first coil 30A is wound according to the direction and the order of arrow ⑥. Because n=5 is an odd number, a number of turns of the sixth layer (i.e., (n+1)-th layer) of the first coil 30A is equal to the number of turns (i.e., 9) of the fifth layer (i.e., n-th layer) of the first coil 30A minus one. Accordingly, a number of turns of the sixth layer of the first coil 30A is 8.

Figure 4B:
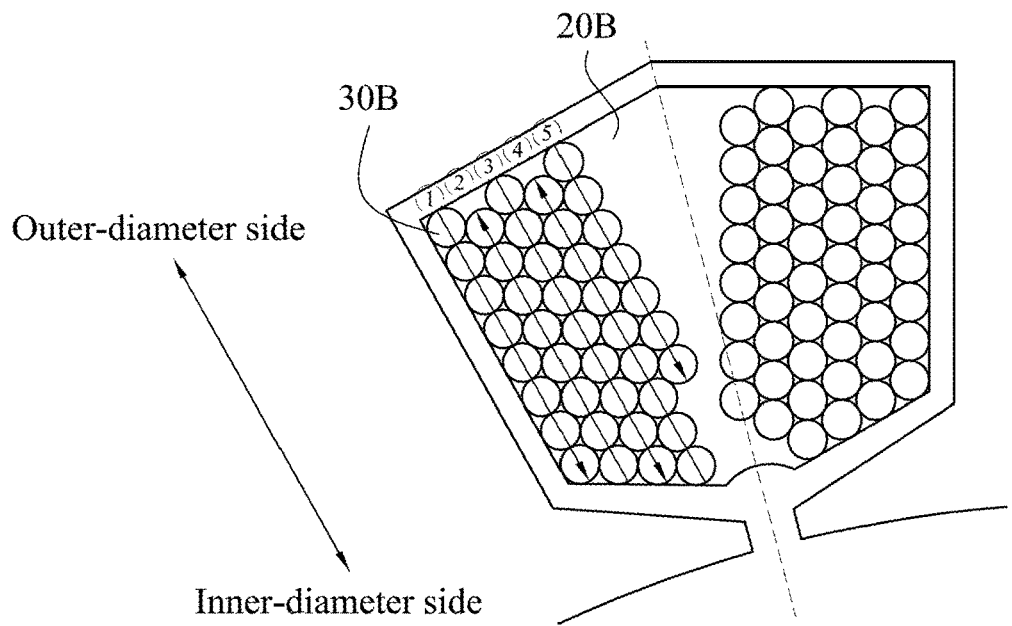

In the third embodiment of the present invention, in step (S3), as shown in FIG. 4b, a first layer of a second coil 30B is wound within the second wiring region 20B of the slot 20 from the outer-diameter side of the stator 100 toward the inner-diameter side of the stator 100, and then a second layer of the second coil 30B is wound within the second wiring region 20B from the inner-diameter side of the stator 100 toward the outer-diameter side of the stator 100 so as to overlay the first layer of the second coil 30B, and so on. The step (S3) is performed until the fourth layer (i.e., (n−1)-th layer) of the second coil 30B is wound. As shown in FIG. 4b, the first layer, the second layer, the third layer, and the fourth layer of the second coil 30B are respectively wound according to the direction and the order of arrows ①, ②, ③, and ④. As shown in FIG. 4b, the first layer, the second layer, the third layer, and the fourth layer of the second coil 30B are wound by a manner for filling the second wiring region 20B with the largest space factor. Accordingly, the number of turns of the first layer of the second coil 30B is 8, and the number of turns of the second layer of the second coil 30B is 8, and the number of turns of the third layer of the second coil 30B is 9, and the number of turns of the fourth layer of the second coil 30B is 9.

In the third embodiment of the present invention, in step (S4), as shown in FIG. 4b, a fifth layer (i.e., n-th layer) of the second coil 30B is wound within the slot 20. As shown in FIG. 4b, the fifth layer of the second coil 30B is wound according to the direction and the order of arrow ⑤. A number of turns of the fifth layer (i.e., n-th layer) of the second coil 30B is equal to the number of turns (i.e., 9) of the fifth layer (i.e., n-th layer) of the first coil 30A minus two, and therefore, a number of turns of the fifth layer of the second coil 30B is 7.

Figure 4C:
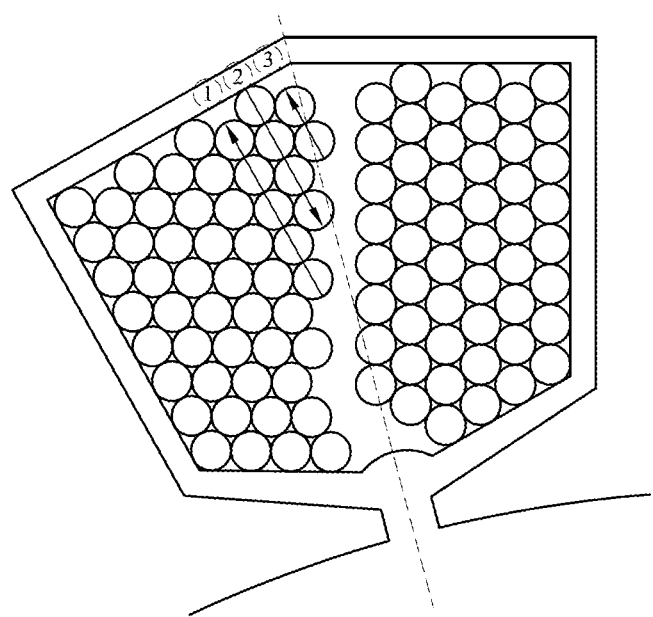

In the third embodiment of the present invention, in step (S5), as shown in FIG. 4c, layers of the second coil 30B that are wound after the fifth layer (i.e., n-th layer) of the second coil 30B are sequentially wound within the slot 20 so as to fill the second wiring region 20B, in which a portion of the second coil 30B would exceed the second wiring region 20B. The step (S5) is performed until one of turns of an eighth layer of the second coil 30B which is close to the outer-diameter side of the stator 100 is located at an end position closest to the centerline 16 within the second wiring region 20B, and the eighth layer of the second coil 30B is defined as the final layer of the second coil 30B. As shown in FIG. 4c, the sixth layer, the seventh layer, and the eighth layer of the second coil 30B are respectively wound according to the direction and the order of arrows ①, ②, and ③. As shown in FIG. 4c, a number of turns of one of even-numbered layers (i.e., the sixth layer of the second coil 30B) of the second coil 30B which are wound after the fifth layer (i.e., n-th layer) of the second coil 30B is equal to a number of turns of a layer of the second coil 30B that is wound preceding the one of the even-numbered layers minus two, in which the even-numbered layers of the second coil 30B do not include the final layer of the second coil 30B. As shown in FIG. 4c, a number of turns of one of odd-numbered layers (i.e., the seventh layer of the second coil 30B) of the second coil 30B which are wound after the fifth layer (i.e., n-th layer) of the second coil 30B is equal to a number of turns of a layer of the second coil 30B that is wound preceding the one of the odd-numbered layers minus one, in which the odd-numbered layers of the second coil 30B do not include the final layer of the second coil 30B. Accordingly, a number of turns of the sixth layer of the second coil 30B is a number of turns (i.e., 7) of the fifth layer of the second coil 30B minus two, that is, a number of turns of the sixth layer of the second coil 30B is 5. Accordingly, a number of turns of the seventh layer of the second coil 30B is a number of turns (i.e., 5) of the sixth layer of the second coil 30B minus one, that is, a number of turns of the seventh layer of the second coil 30B is 4.

In the third embodiment of the present invention, in step (S6), as shown in FIG. 4c, because the eighth layer (i.e., the final layer) of the second coil 30B is wound from the inner-diameter side toward the outer-diameter side of the stator 100, a number of turns of the eighth layer (i.e., the final layer) of the second coil 30B is equal to a number of turns (i.e., 4) of a layer (i.e., the seventh layer) of the second coil 30B that is wound preceding the final layer of the second coil 30B minus two. Accordingly, a number of turns of the eighth layer of the second coil 30B is 2.

Figure 4D:
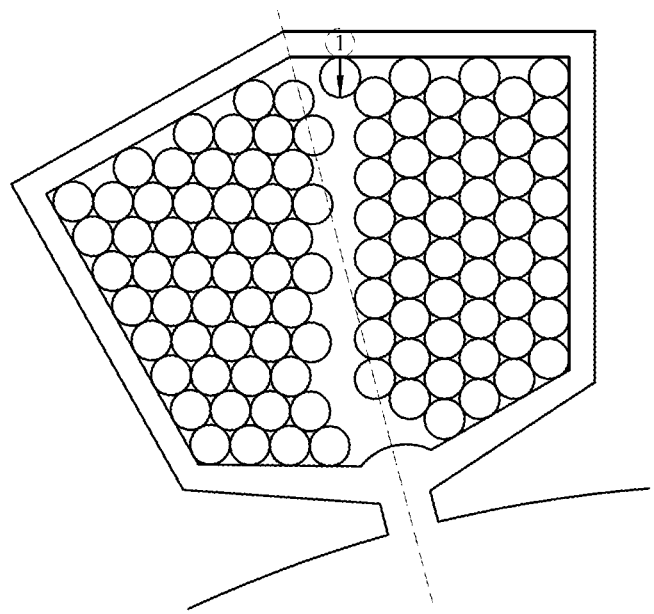

In the third embodiment of the present invention, in step (S7), as shown in FIG. 4d, layers of the first coil 30A that are wound after the sixth layer (i.e., the (n+1)-th layer) of the first coil 30A are sequentially wound within the slot 20 according to a manner that the layers of the first coil 30A would not slide off the stator 100 so as to fill the slot 20. The step (S7) is performed until the seventh layer of first coils 30A has filled the remaining space of the slot 20, and the seventh layer of the first coil 30A is defined as the final layer of the first coil 30A. As shown in FIG. 4d, the seventh layer of the first coil 30A is wound according to the direction and the order of arrow ①. Accordingly, as shown in FIG. 4d, a number of turns of the seventh layer of the first coil 30A is 1.

Figure 4E:
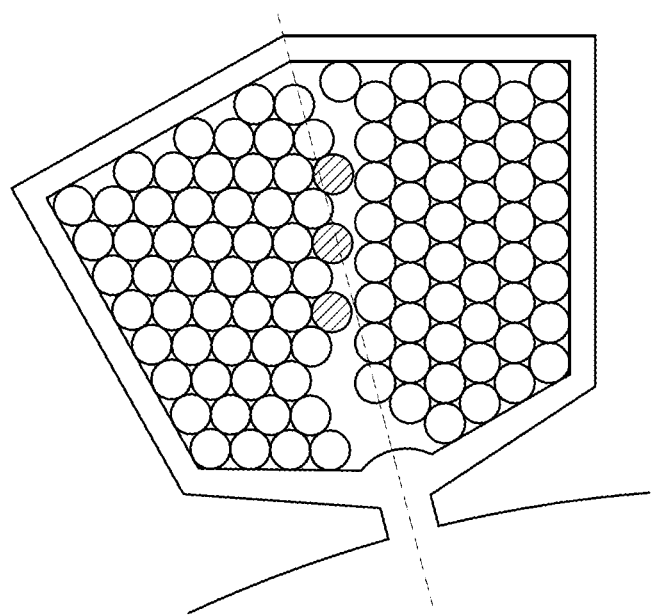

In the third embodiment of the present invention, in step (S8), as shown in FIG. 4e, after winding the seventh layer (i.e., the final layer) of the first coil 30A, if there is enough remaining space (i.e., the remaining space can accommodate the wire diameter of the second coil 30B) within the first wiring region 20A and the second wiring region 20B, a number of turns of at least one of layers that are from the sixth layer (i.e., the (n+1)-th layer) to the eighth layer (i.e., the final layer) of the second coil 30B is increased so as to fill a remaining space of the first wiring region 20A and the second wiring region 20B. Accordingly, as shown in FIG. 4e, the numbers of turns of the sixth layer, the seventh layer, and the eighth layer of the second coil 30B are increased by one turn (i.e., the dark-colored turns as shown in FIG. 4e) so as to fill a remaining space of the first wiring region 20A and the second wiring region 20B. In other words, a number of turns of the sixth layer of the second coil 30B is 6, and a number of turns of the seventh layer of the second coil 30B is 5, and a number of turns of the eighth layer of the second coil 30B is 3.

Hereinafter, the wiring method of the present invention will be explained by using FIGS. 5a-5d. FIGS. 5a-5d illustrate schematic views of a winding procedure of a portion of the stator 100 according to a fourth embodiment of the present invention.

Figure 5A:
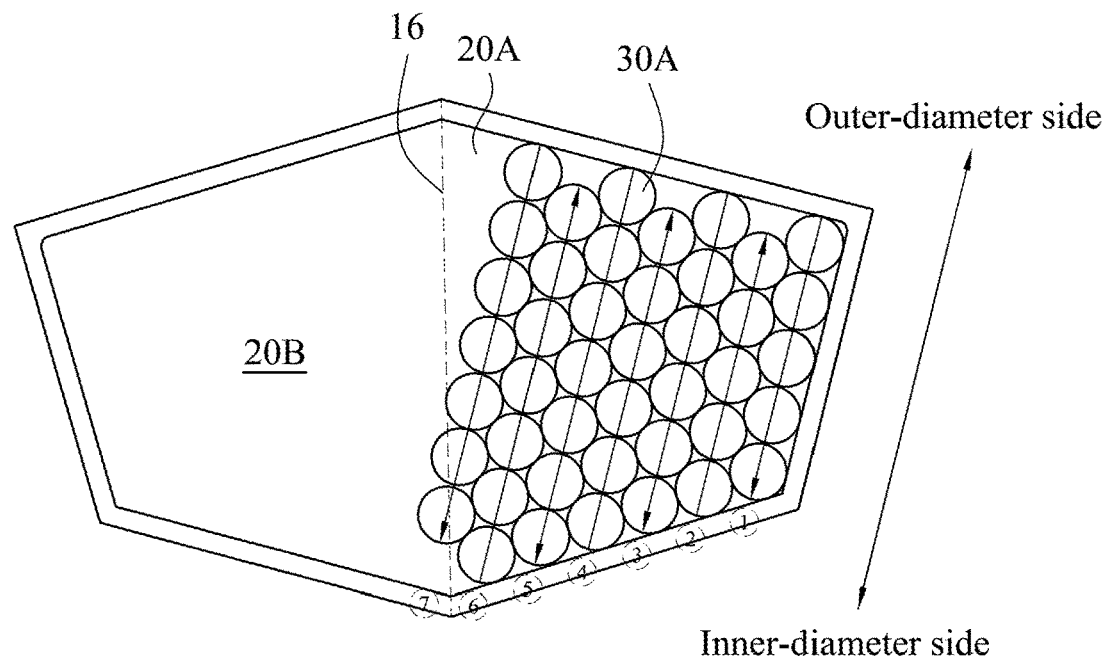
FIGS. 5a-5d illustrate schematic views for describing a winding procedure according to a fourth embodiment of the present invention.

In the fourth embodiment of the present invention, in step (S1), as shown in FIG. 5a, a first layer of a first coil 30A is wound within the first wiring region 20A of the slot 20 from the outer-diameter side of the stator 100 toward the inner-diameter side of the stator 100, and then a second layer of the first coil 30A is wound within the first wiring region 20A from the inner-diameter side of the stator 100 toward the outer-diameter side of the stator 100 so as to overlay the first layer of the first coil 30A, and so on. The step (S1) is performed until a closest distance between a sixth layer of the first coil 30A and the centerline 16 is less than a threshold (i.e., a wire diameter of the first coil 30A times 0.6), and the sixth layer of the first coil 30A is defined as n-th layer of the first coil 30A, that is, n=6. As shown in FIG. 5a, the first layer, the second layer, the third layer, the fourth layer, the fifth layer, and the sixth layer of the first coil 30A are respectively wound according to the direction and the order of arrows ①, ②, ③, ④, ⑤, and ⑥. As shown in FIG. 5a, the first layer, the second layer, the third layer, the fourth layer, the fifth layer, and the sixth layer of the first coil 30A are wound by a manner for filling the first wiring region 20A with the largest space factor. Accordingly, the number of turns of the first layer of the first coil 30A is 5, and the number of turns of the second layer of the first coil 30A is 5, and the number of turns of the third layer of the first coil 30A is 6, and the number of turns of the fourth layer of the first coil 30A is 6, and the number of turns of the fifth layer of the first coil 30A is 7, and the number of turns of the sixth layer of the first coil 30A is 7.

In the fourth embodiment of the present invention, in step (S2), as shown in FIG. 5a, a seventh layer (i.e., (n+1)-th layer) of the first coil 30A is wound within the slot 20 according to a manner that the seventh layer of the first coil 30A would not slide off the stator 100. As shown in FIG. 5a, the seventh layer of the first coil 30A is wound according to the direction and the order of arrow ⑦, and a portion of the first coil 30A would exceed the first wiring region 20A. Because n=6 is an even number, a number of turns of the seventh layer (i.e., (n+1)-th layer) of the first coil 30A is equal to the number of turns (i.e., 7) of the sixth layer (i.e., n-th layer) of the first coil 30A. Accordingly, a number of turns of the seventh layer of the first coil 30A is 7.

Figure 5B:
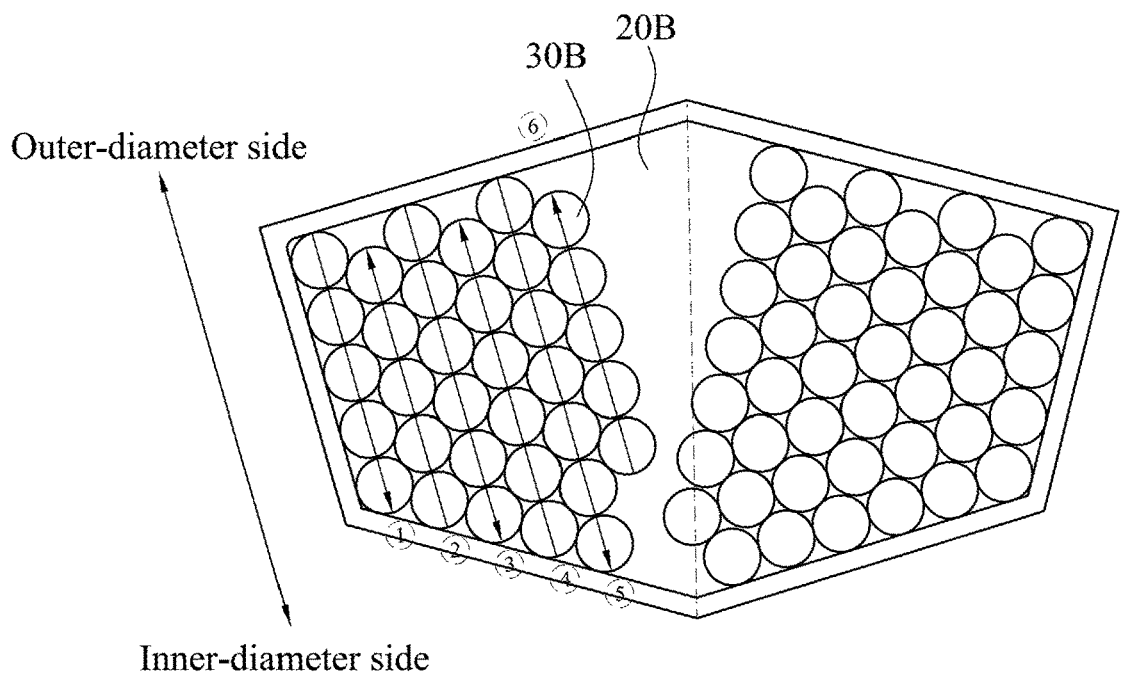

In the fourth embodiment of the present invention, in step (S3), as shown in FIG. 5b, a first layer of a second coil 30B is wound within the second wiring region 20B of the slot 20 from the outer-diameter side of the stator 100 toward the inner-diameter side of the stator 100, and then a second layer of the second coil 30B is wound within the second wiring region 20B from the inner-diameter side of the stator 100 toward the outer-diameter side of the stator 100 so as to overlay the first layer of the second coil 30B, and so on. The step (S3) is performed until the fifth layer (i.e., (n−1)-th layer) of the second coil 30B is wound. As shown in FIG. 5b, the first layer, the second layer, the third layer, the fourth layer, and the fifth layer of the second coil 30B are respectively wound according to the direction and the order of arrows ①, ②, ③, ④, and ⑤. As shown in FIG. 5b, the first layer, the second layer, the third layer, the fourth layer, and the fifth layer of the second coil 30B are wound by a manner for filling the second wiring region 20B with the largest space factor. Accordingly, the number of turns of the first layer of the second coil 30B is 5, and the number of turns of the second layer of the second coil 30B is 5, and the number of turns of the third layer of the second coil 30B is 6, and the number of turns of the fourth layer of the second coil 30B is 6, and the number of turns of the fifth layer of the second coil 30B is 7.

In the fourth embodiment of the present invention, in step (S4), as shown in FIG. 5b, a sixth layer (i.e., n-th layer) of the second coil 30B is wound within the slot 20. As shown in FIG. 5b, the sixth layer of the second coil 30B is wound according to the direction and the order of arrow ⑥. A number of turns of the sixth layer (i.e., n-th layer) of the second coil 30B is equal to the number of turns (i.e., 7) of the sixth layer (i.e., n-th layer) of the first coil 30A minus two, and therefore, a number of turns of the sixth layer of the second coil 30B is 5.

Figure 5C:
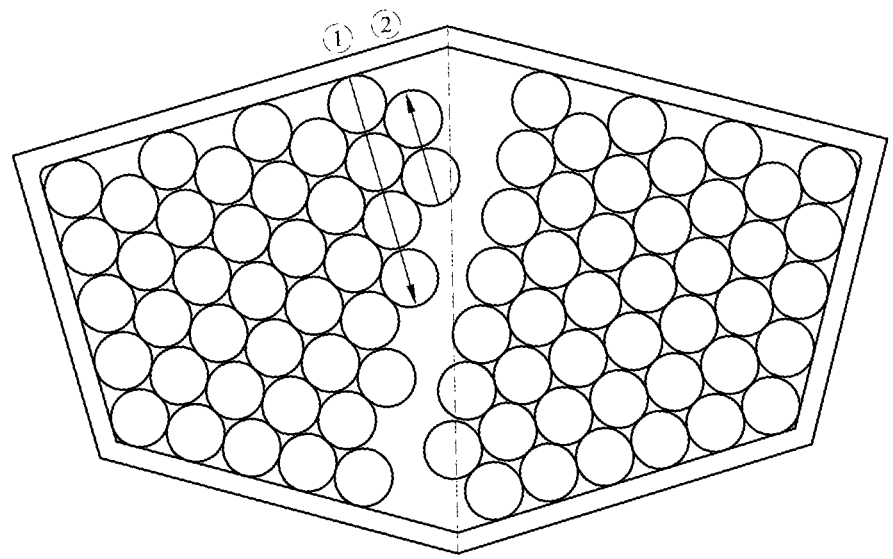

In the fourth embodiment of the present invention, in step (S5), as shown in FIG. 5c, layers of the second coil 30B that are wound after the sixth layer (i.e., n-th layer) of the second coil 30B are sequentially wound within the slot 20 so as to fill the second wiring region 20B, in which a portion of the second coil 30B would exceed the second wiring region 20B. The step (S5) is performed until one of turns of an eighth layer of the second coil 30B which is close to the outer-diameter side of the stator 100 is located at an end position closest to the centerline 16 within the second wiring region 20B, and the eighth layer of the second coil 30B is defined as the final layer of the second coil 30B. As shown in FIG. 5c, the seventh layer and the eighth layer of the second coil 30B are respectively wound according to the direction and the order of arrows ① and ②. As shown in FIG. 5c, a number of turns of one of odd-numbered layers (i.e., the seventh layer of the second coil 30B) of the second coil 30B which are wound after the sixth layer (i.e., n-th layer) of the second coil 30B is equal to a number of turns of a layer of the second coil 30B that is wound preceding the one of the odd-numbered layers minus one, in which the odd-numbered layers of the second coil 30B do not include the final layer of the second coil 30B. Accordingly, a number of turns of the seventh layer of the second coil 30B is a number of turns (i.e., 5) of the sixth layer of the second coil 30B minus one, that is, a number of turns of the seventh layer of the second coil 30B is 4.

In the fourth embodiment of the present invention, in step (S6), as shown in FIG. 5c, because the eighth layer (i.e., the final layer) of the second coil 30B is wound from the inner-diameter side toward the outer-diameter side of the stator 100, a number of turns of the eighth layer (i.e., the final layer) of the second coil 30B is equal to a number of turns (i.e., 4) of a layer (i.e., the seventh layer) of the second coil 30B that is wound preceding the final layer of the second coil 30B minus two. Accordingly, a number of turns of the eighth layer of the second coil 30B is 2.

Figure 5D:
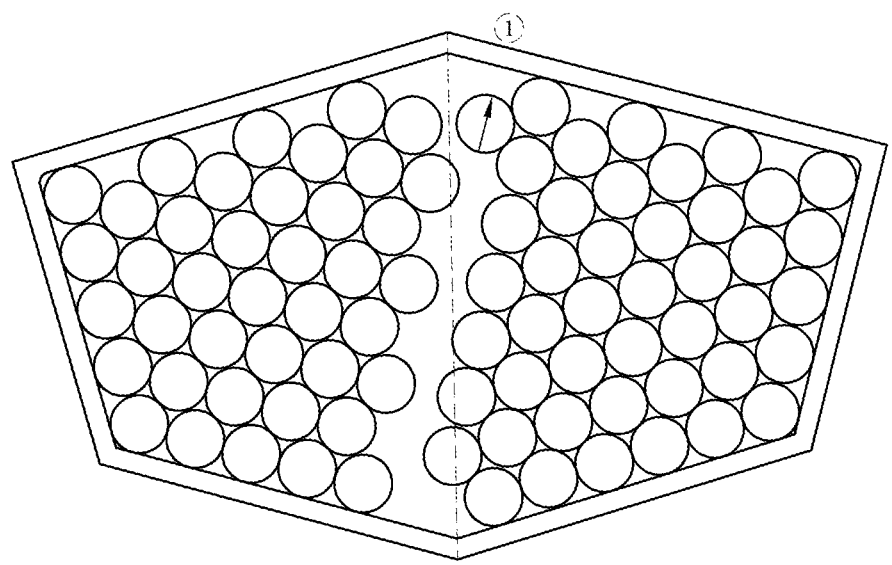

In the fourth embodiment of the present invention, in step (S7), as shown in FIG. 5d, layers of the first coil 30A that are wound after the seventh layer (i.e., the (n+1)-th layer) of the first coil 30A are sequentially wound within the slot 20 according to a manner that the layers of the first coil 30A would not slide off the stator 100 so as to fill the slot 20. The step (S7) is performed until the eighth layer of first coils 30A has filled the remaining space of the slot 20, and the eighth layer of the first coil 30A is defined as the final layer of the first coil 30A. As shown in FIG. 5d, the eighth layer of the first coil 30A is wound according to the direction and the order of arrow ①. Accordingly, as shown in FIG. 5d, a number of turns of the eighth layer of the first coil 30A is 1.

The greater the number of turns of the coils wound the stator of the rotating electric machine, the more the torque performance of the rotating electric machine can be improved. In other words, the greater the space factor, the more the torque performance of the rotating electric machine can be improved. The present invention provides a wiring method of a stator of a rotating electric machine, in which the first coil wound within the first wiring region and the second coil wound within the second wiring region are not symmetrical with the centerline, and the number of turns of the first coil is not consistent with the number of turns of the second coil, such that the winding space is fully utilized, thereby improving the space factor so as to improve the torque performance of the rotating electric machine.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wiring method of a stator of a rotating electric machine, wherein the stator has a plurality of first tooth portions and a plurality of second tooth portions, wherein one of the first tooth portions is located between two adjacent ones of the second tooth portions, wherein a slot is formed between the one of the first tooth portions and one of the second tooth portions adjacent to the one of the first tooth portions, wherein the slot is divided by a centerline extending toward an axis of the stator to form a first wiring region adjacent to the one of the first tooth portions and a second wiring region adjacent to the one of the second tooth portions, wherein the wiring method comprises:

winding m-th layer of a first coil within the first wiring region in a first direction, wherein the first direction is from an outer-diameter side of the stator toward an inner-diameter side of the stator;

winding (m+1)-th layer of the first coil in a second direction to overlay the m-th layer of the first coil, wherein the second direction is from the inner-diameter side of the stator toward the outer-diameter side of the stator;

winding (n+1)-th layer of the first coil according to a manner that the (n+1)-th layer of the first coil would not slide off the stator when a closest distance between n-th layer of the first coil and the centerline is less than a threshold;

winding m-th layer of a second coil within the second wiring region in the first direction;

winding (m+1)-th layer of the second coil in the second direction to overlay the m-th layer of the second coil;

winding n-th layer of the second coil, wherein a number of turns of the n-th layer of the second coil is equal to a number of turns of the n-th layer of the first coil minus two;

sequentially winding from (n+1)-th layer of the second coil to a final layer of the second coil so as to fill the second wiring region and/or the first wiring region, wherein one of turns of the final layer of the second coil which is close to the outer-diameter side of the stator is located at an end position closest to the centerline within the second wiring region; and sequentially winding from (n+2)-th layer of the first coil to a final layer of the first coil within the slot so as to fill the first wiring region and/or the second wiring region.

2. The wiring method of claim 1, wherein m is an odd number, wherein m≤n.

3. The wiring method of claim 1, wherein the threshold is equal to a wire diameter of the first coil times 0.6.

4. The wiring method of claim 1, wherein if n is an odd number, a number of turns of the (n+1)-th layer of the first coil is equal to the number of turns of the n-th layer of the first coil minus one.

5. The wiring method of claim 1, wherein if n is an even number, a number of turns of the (n+1)-th layer of the first coil is equal to the number of turns of the n-th layer of the first coil.

6. The wiring method of claim 1, wherein a number of turns of one of odd-numbered layers of the second coil which are wound after the n-th layer of the second coil is equal to a number of turns of a layer of the second coil that is wound preceding the one of the odd-numbered layers minus one, wherein the odd-numbered layers of the second coil do not include the final layer of the second coil.

7. The wiring method of claim 1, wherein a number of turns of one of even-numbered layers of the second coil which are wound after the n-th layer of the second coil is equal to a number of turns of a layer of the second coil that is wound preceding the one of the even-numbered layers minus two, wherein the even-numbered layers of the second coil do not include the final layer of the second coil.

8. The wiring method of claim 1, wherein if the final layer of the second coil is wound in the first direction, a final turn of the final layer of the second coil is ended at a position that is closest to and not exceeding the centerline.

9. The wiring method of claim 1, wherein if the final layer of the second coil is wound in the second direction, a number of turns of the final layer of the second coil is equal to a number of turns of a layer of the second coil that is wound preceding the final layer of the second coil minus two.

10. The wiring method of claim 1, wherein winding from the (n+2)-th layer of the first coil to the final layer of the first coil so as to fill a space of the first wiring region and/or the second wiring region of the slot.

11. The wiring method of claim 10, further comprising:

after winding the final layer of the first coil, increasing a number of turns of at least one of layers that are from the (n+1)-th layer of the second coil to the final layer of the second coil so as to fill a remaining space of the first wiring region and the second wiring region.

* * * * *